(12) United States Patent
Schiesser et al.

(10) Patent No.: US 8,818,902 B2
(45) Date of Patent: Aug. 26, 2014

(54) DIGITAL STORAGE MEDIA DISPENSING DEVICE

(75) Inventors: Keith A. Schiesser, Lawrenceville, GA (US); Webb Morris, Smyrna, GA (US)

(73) Assignee: NCR Corporation, Duluth, GA (US)

( * ) Notice: Subject to any disclaimer, the term of this patent is extended or adjusted under 35 U.S.C. 154(b) by 96 days.

(21) Appl. No.: 12/953,561

(22) Filed: Nov. 24, 2010

(65) Prior Publication Data
US 2012/0130533 A1    May 24, 2012

(51) Int. Cl.
*G06F 21/00*    (2013.01)

(52) U.S. Cl.
USPC .............................. 705/59; 705/911

(58) Field of Classification Search
USPC .................................... 705/59, 911
See application file for complete search history.

(56) References Cited

U.S. PATENT DOCUMENTS

| | | | | |
|---|---|---|---|---|
| 5,745,458 | A * | 4/1998 | Oliver et al. | 369/53.28 |
| 6,757,683 | B2 * | 6/2004 | Goodwin et al. | 1/1 |
| 7,760,600 | B2 * | 7/2010 | Liao et al. | 369/53.2 |
| 2005/0138357 | A1 * | 6/2005 | Swenson et al. | 713/155 |
| 2007/0014535 | A1 * | 1/2007 | Rathbun et al. | 386/94 |
| 2007/0051802 | A1 * | 3/2007 | Barber et al. | 235/383 |
| 2007/0157005 | A1 * | 7/2007 | Ueda | 712/200 |
| 2007/0260551 | A1 * | 11/2007 | Eckleder | 705/59 |
| 2009/0070122 | A1 * | 3/2009 | Hauck et al. | 705/1 |
| 2009/0228520 | A1 * | 9/2009 | Yahata et al. | 707/104.1 |
| 2009/0245053 | A1 * | 10/2009 | Onoda et al. | 369/53.2 |
| 2009/0326708 | A1 * | 12/2009 | Rudy et al. | 700/234 |
| 2011/0234514 | A1 * | 9/2011 | Gothard | 345/173 |

FOREIGN PATENT DOCUMENTS

EP    2113892 A1 *    4/2009    ............. G07F 17/30

OTHER PUBLICATIONS

"DVD Identifier", dvd.identifier.cdfreaks.com, all pages, Jan. 12, 2009. http://web.archive.org/web/20090122232840/http://dvd.identifier.cdfreaks.com/my_site/screenshots.php.*

* cited by examiner

*Primary Examiner* — Calvin Cheung
(74) *Attorney, Agent, or Firm* — Robert S. Chee; Paul W. Martin

(57) ABSTRACT

Methods and techniques are described to dynamically provide preloaded movies on digital storage devices that may be purchased or leased by a consumer on a self-service media content dispensing device, such as a kiosk. A media content dispensing device stores various media content obtained physically or via a network on a server at a dispensing device. When a request is received from a user to purchase or lease a particular title, the user may provide a blank storage device and exchange the blank storage device to receive the media content preloaded on a storage device provided by the dispensing device. The dispensing device will then store the title, or a different title, on the blank storage device provided by the user for purchase or lease by another to maintain inventory. The dispensing device may also change an existing preloaded storage device to a different title to maintain inventory.

9 Claims, 5 Drawing Sheets

DIGITAL STORAGE MEDIA DISPENSING DEVICE

FIELD OF THE INVENTION

The present invention relates, generally, to kiosks.

BACKGROUND

The methods in which consumers procure and view media content for private use continually evolves. When the widespread adoption of video home system (VHS) video cassette recorders occurred, retailers leased or sold media content to consumers at commercial retail locations. This has continued through the advent and adoption of digital versatile discs (DVDs). Rentals and purchases have since moved to alternate delivery methods such as delivery via the postal service and online. Another such delivery method is via a self-service media content dispensing device, such as a kiosk. Consumers seek the advantages of a self-service device, and the small footprint (as opposed to the overhead of a retail establishment) is advantageous to the service provider. As these self-service devices become more popular, methods and techniques to improve the consumer experience with these self-service devices becomes more important.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided to maintain inventory of media content at a self-service dispensing device. By dynamically maintaining the inventory to improve the availability of popular and just-released titles, transactions at the self-service dispensing device increases with increasing consumer satisfaction as well.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

One cause of consumer dissatisfaction in the purchase or lease of media content is that the user has made a decision of which media content he or she wishes to obtain, but when the user finally attempts to make the purchase or lease, the title is no longer or not available. This may occur in a retail establishment, and more recently with self-service media content dispensing devices, or kiosks. This especially occurs with newly released titles, where there is an abundance of consumer demand, but only a limited number of copies on digital storage devices (e.g. secure digital ("SD") card, mini SD card, universal serial bus ("USB") flash drive, digital versatile disc ("DVD"), memory card, solid state drive, hard drive, CompactFlash, CD, portable hard drive, Memory Stick, MultiMediaCard, SmartMedia card, etc.) available for the consumer at any one time. This also occurs where the user wishes to view media content that is rare, or more difficult to find as the inventory of a media content dispensing device is limited and will only house very popular titles. As used herein, media content may refer to, but is not limited to, motion pictures, television programs, sporting events, music, video games, concerts, or any other type of media that may be viewed by a user.

This inventory issue has changed based upon the ability to store media content at the time of purchase on a digital storage device. For example, at a media content dispensing device, a user may place a request for a particular media content. The user places his memory storage device in a connection slot in the media content dispensing device and the media content is stored on the memory storage device. Unfortunately, as media content has become larger and larger in size (several gigabytes is not uncommon), the time it takes to store the media content on the memory storage device has increased as well. In many cases, the wait may be as long as ten or more minutes, making this solution impractical where time is of the essence, such as at an airport or outside of a grocery store.

Thus, methods and techniques are described to dynamically provide preloaded movies on digital storage devices that may be purchased or leased by a consumer on a self-service media content dispensing device. This would allow the media content dispensing device to provide the media content in the same amount of time as it currently takes for a preloaded DVD rental and greatly enhances consumer satisfaction.

Figure 1:
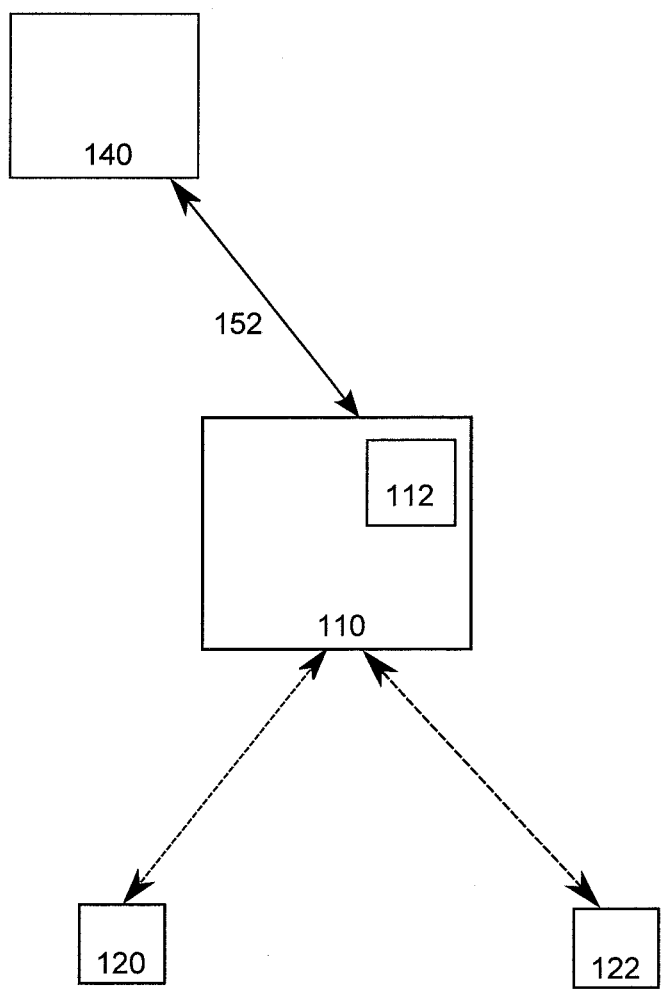
FIG. 1 is a block illustration of a system for providing dynamic inventory management at kiosks, according to an embodiment of the invention.

A media content dispensing device stores various media content, obtained physically or via a network, on a server or other storage device at the media content dispensing device. An illustration of an embodiment is shown in FIG. 1. In FIG. 1, media content dispensing device 110 receives requests from users 120 and 122 for digital storage devices with particular media content preloaded. Media content dispensing device 110 also comprises storage server 112 that stores media content that may be subsequently stored on digital storage devices available for lease or purchase. Storage server 112 may also refer to any type of storage device that is able to store media content for media content dispensing device 110. In the case where particular media content is not available on storage server 112, media content dispensing device may make a request to remote server 140 via network connection 152. In other embodiments, media content dispensing device does not contain storage server 112 and all media content is delivered dynamically to media content dispensing device 110 to respond to requests from users 120 and 122.

When a request is received from a user for purchase or lease of a particular title, the user may provide a digital storage device on which the dispensing device will store the media content. The user may also select to exchange a blank digital storage device and receive the media content preloaded on a digital storage device provided by the media content dispensing device. Under this circumstance, the media content dispensing device provides the user with a preloaded copy of the particular title of media content already in inventory. The media content dispensing device then stores the media content of the title just purchased or leased on the blank digital storage device provided by the user. This replaces the title just purchased or leased and allows for purchase or lease by another user and maintains inventory. If inventory becomes low of a different title, the dispensing device may store a media content of a title different than the title purchased on the provided blank digital storage device. By replacing inventory dynamically, the inventory of digital storage devices for popular titles is maintained by the media content dispensing device, negating the requirement of frequent service visits to refill the machine.

Preloading Media Content with an Exchange

Figure 2A:
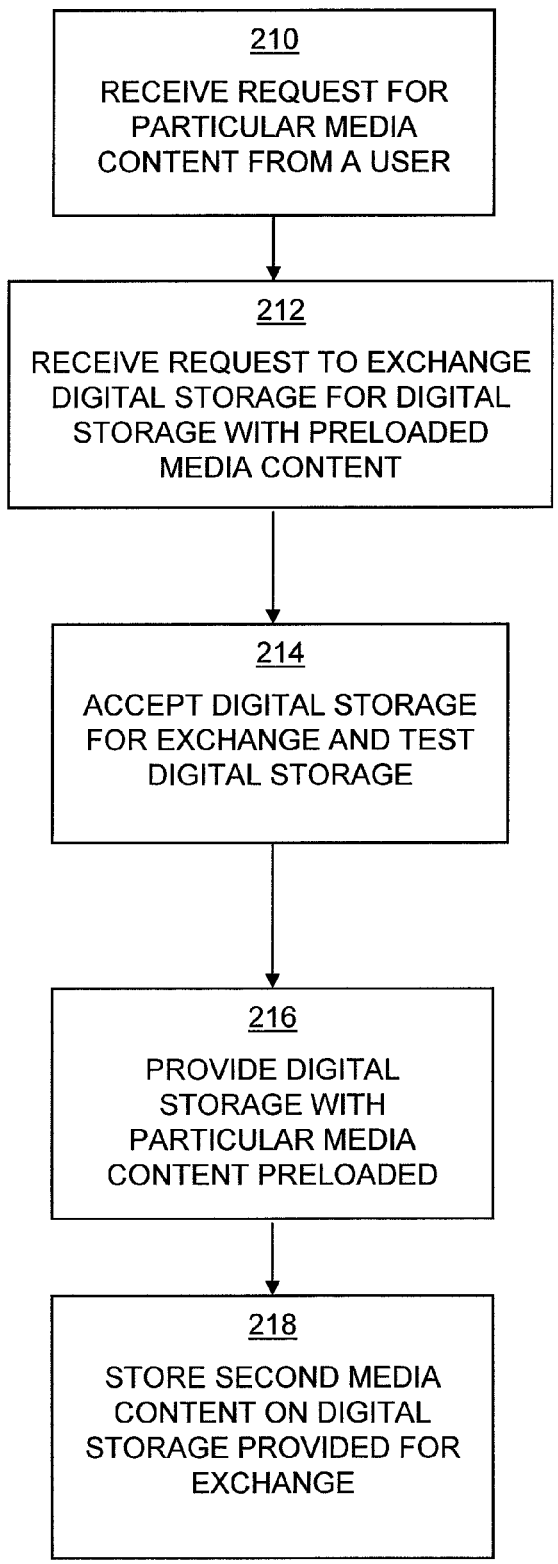
FIGS. 2A-2C are illustrations of workflows for providing dynamic inventory management at kiosks, according to embodiments of the invention.

Methods and techniques are described to enable preloaded movies to be available on digital storage devices that may be purchased by a consumer. A workflow illustration of an embodiment is shown in FIG. 2A. In an embodiment, a user selects which particular title of media content that they wish to lease or purchase. This is shown in step 210. The media content dispensing device, or kiosk, may then offer the user a choice of whether he wishes to lease or purchase a preloaded digital storage device with the title, or have the media content dispensing device load the media content on his digital storage device while he waits. If a preloaded digital storage device is selected, then the user may be given a choice of whether he wishes to purchase or lease the digital storage device outright, or if he would like to exchange the device with his blank digital storage device. In an embodiment, if the purchase was for the preloaded digital storage device outright, then a higher fee may be charged to the user (to compensate for both the media content and the digital storage device). In an embodiment, if the purchase was for the preloaded digital storage device with an exchange, then the user may be charged a slightly lower (as there is savings in not having to replace the digital storage device). A request from the user to exchange digital storage devices by a user is shown as step 212.

In an embodiment, if a request was received that an exchange is to be made, then the user is prompted to provide their blank digital storage device to the media content dispensing device. The blank digital storage device may be placed in an opening in the media content dispensing device or accepted by the media content dispensing device using any other method. In an embodiment, once the blank digital storage device is received, the media content dispensing device performs tests on the digital storage device. This is shown as step 214. The media content dispensing device may perform tests including, but not limited to, whether the digital storage device is able to store media content, the amount of storage that may be stored on the digital storage device, whether the digital storage device is compatible with the storage mechanism of the media content dispensing device, whether the digital storage device must be formatted, and any other test to confirm that the digital storage device may be re-used by the media content dispensing device.

In an embodiment, once the digital storage device is confirmed though testing that it may be re-used by the media content dispensing device, the media content dispensing device dispenses to the user a preloaded digital storage device with the media content of the particular title that the user requested as shown in step 216. The media content dispensing device may dispense the preloaded digital storage device through a slot or door located on the media content dispensing device, or through any other method by which the preloaded digital storage device may be provided to the user. In an embodiment, if the media content was for lease, then digital storage device with the particular media content preloaded allows viewing of the particular media content within a predetermined window period where the particular media content was leased. This window period may vary, but for example, may be 14 days. In an embodiment, the user may be given an unlimited number of viewings within those 14 days. In another embodiment, there may be a limited viewing period once viewing of the media content has started. For example, once viewing of the media content has begun, the user might be given a limited period, such as 48 hours, from when the media content was started in order to view the entire presentation. Window periods and viewing windows may vary from implementation to implementation.

In an embodiment, once the preloaded digital storage device is dispensed by the media content dispensing device, the media content dispensing device stores a second media content to be made available for lease or purchase the just provided digital storage device as shown in step 218. The second media content may be the title just leased or purchased by the user. The second media content may also be a different title than the title just leased or purchased by the user. Under this circumstance, the media content dispensing device might determine the inventory of various titles and their recent rental rates. If any of the titles are low on inventory and are deemed likely to be rented, then the media content dispensing device may store the title that is running very low on inventory rather then the title just leased or purchased. In an embodiment, the second media content may be stored on a server at the media content dispensing device in order to be stored onto digital storage devices. In another embodiment, the second media content may not be currently stored on the media content dispensing device, and the second media content may be retrieved by a network connection. Once the second media content is stored on the digital storage device by the media content dispensing device, the digital storage device is placed into inventory to be available for lease or purchase by a user.

In an embodiment, as the preloaded digital storage device is placed into inventory, a label may be printed or placed on the digital storage device indicating the name of the media content. This is so that preloaded digital storage device may readily be identified by a user as to the contents of the device. In an embodiment, other information may also be placed or printed on the label For example, the production company, the media content dispensing device operator, advertisements for future releases, or discount codes or coupons might be included on the label. The information will vary based upon the physical size of the digital storage device and the label. The information will vary from implementation to implementation.

Adjusting Media Content Inventory

Figure 2B:
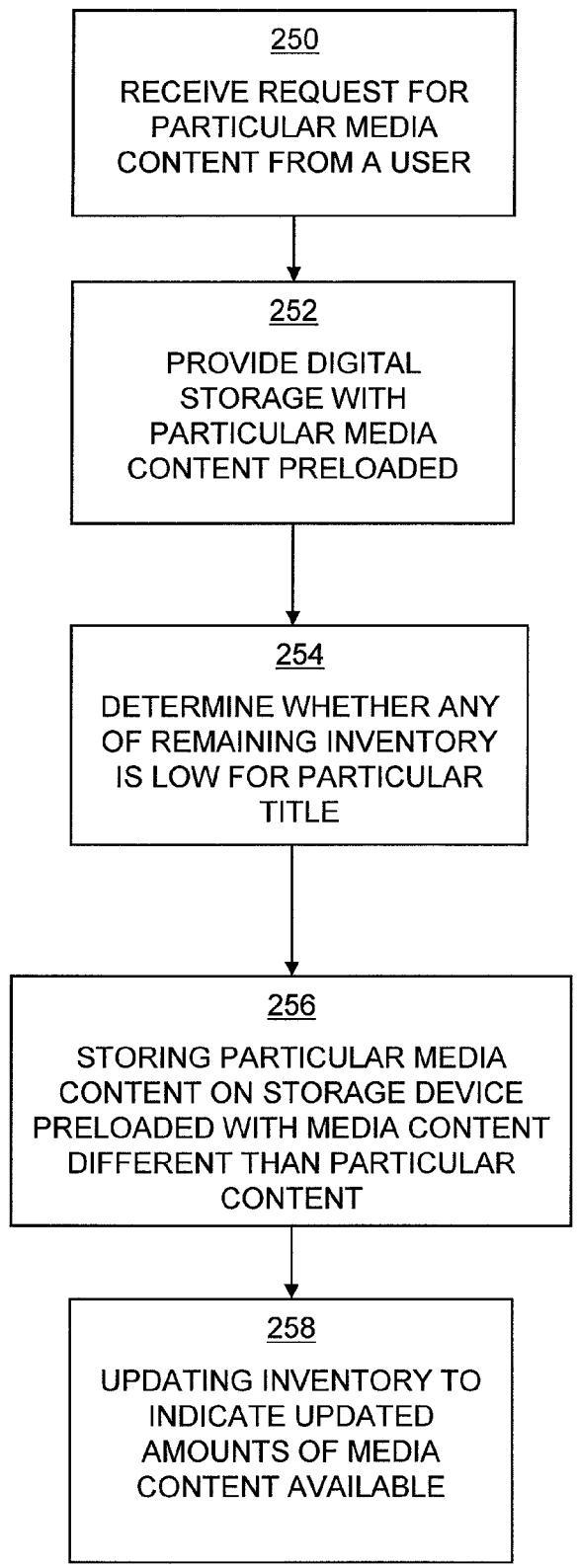

In an embodiment, the media content dispensing device may also adjust existing inventory on the device. Under this circumstance, rather than being only able to add inventory via added digital storage devices, the media content dispensing device takes existing inventory of digital storage devices and may change the media content that is stored on the digital storage devices. An example of this workflow is shown in FIG. 2B.

In an embodiment, a media content dispensing device receives a request from a user for a particular media content for purchase or lease as shown as step 250. In step 252, the media content dispensing device then provides the digital storage device with the particular media content preloaded. The user may or may not provide his own digital storage device to the media dispensing device. Either case does not change how the media content dispensing adjusts inventory.

In an embodiment, the media content dispensing device determines whether remaining inventory of any particular media content in inventory reaches a particular threshold as shown in step 254. This may be for the title just leased or purchased, or any other title within inventory. The threshold may be a predetermined number, such as two left in the device, or for particularly popular titles, the threshold may be derived based upon a ratio of number of copies left divided by the number of copies leased or purchased in a specific time period. This threshold may vary from implementation to implementation. In step 256, if a title is found to be below a threshold, then the media content dispensing device will store on a digital storage device preloaded with media content different from the media content found to be low in inventory. The selection of which title should be erased and replaced by the media content low in inventory may be based on transaction history (e.g., title that is no longer selling as well, etc.), or age of title (e.g. title has been in machine for over two months, etc.), or any other method that would indicate that the title is less likely to be purchased or leased.

In an embodiment, as shown in step 258, once the media content has been stored of the title with low inventory, the media content dispensing device updates the total inventory of the device to indicate that an additional copy of the particular media content is available and one less copy of the media content that has been over-written is no longer available. In addition, the label of the digital storage device that has just been changed is also changes to reflect the new media content that is now stored on the digital storage device.

Providing Currently Unavailable Media Content

Figure 2C:
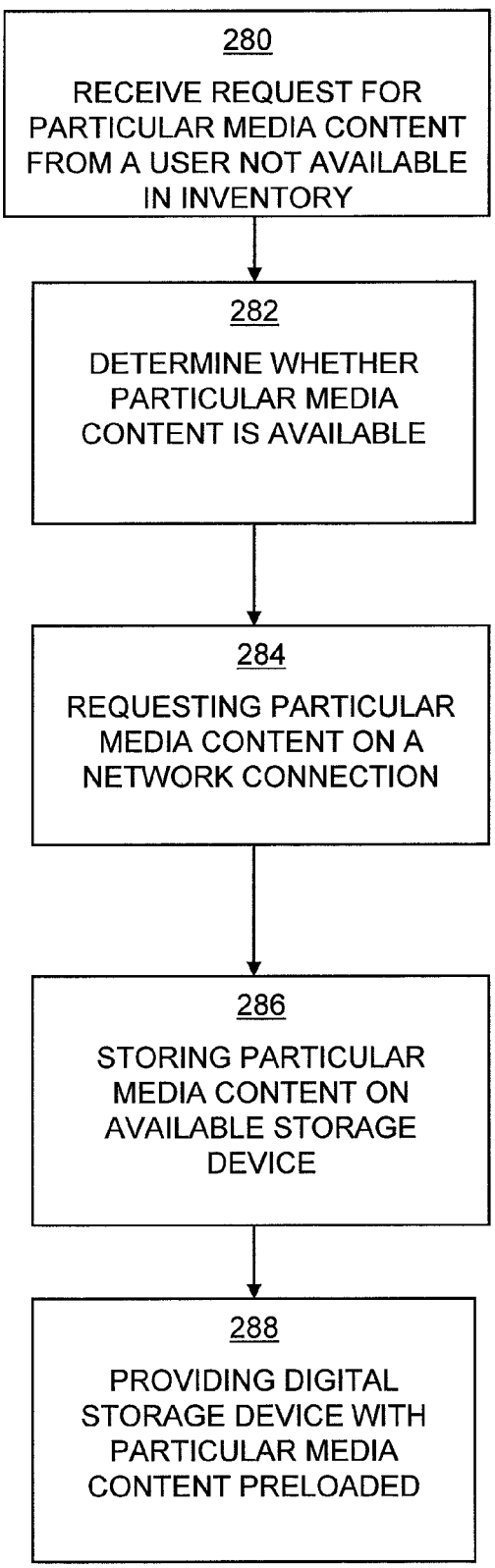

In an embodiment, dynamically providing inventory at a media content dispensing device also provides the ability of the device to preload media content that is not currently in inventory at the device. For example, a user might wish to lease or purchase a media content that is rare or not popular. Since inventory of a media content dispensing device is limited, this ability to dynamically provide titles allows users to submit requests beforehand and the media content dispensing device will provide the media content when the user arrives at the device for pickup. An illustration of an embodiment is shown in the workflow illustrated in FIG. 2C.

In an embodiment, as shown in step 280, a media content dispensing device receives a request from a user for a particular media content in advance of a purchase or lease that is not in available inventory. This request may be from an online request or made through any mobile device. The request may be made prior to when the user has visited the device to gain the full advantage of time based on this method.

In an embodiment, the media content dispensing device determines whether the particular media content is available to be stored on a digital storage device as shown in step 282. The media content dispensing device may query a remote server, a local storage device, or another remote storage location in order to determine whether the media content may be made available for the user. If the media content is remote, the media content may be requested and sent to the media content dispensing device via a network connection as shown in step 284. Once the particular media content is available at the media content dispensing device, the media content is stored on an available digital storage device as in step 286. This available digital storage device may be blank digital storage devices held by the media content dispensing device, or may be a rarely purchased title that is over-written to accommodate the user request. Finally, as shown in step 288, the media content dispensing device provides the digital storage device with the particular media content preloaded to the user when the user arrives at the media content dispensing device to fulfill his earlier request.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
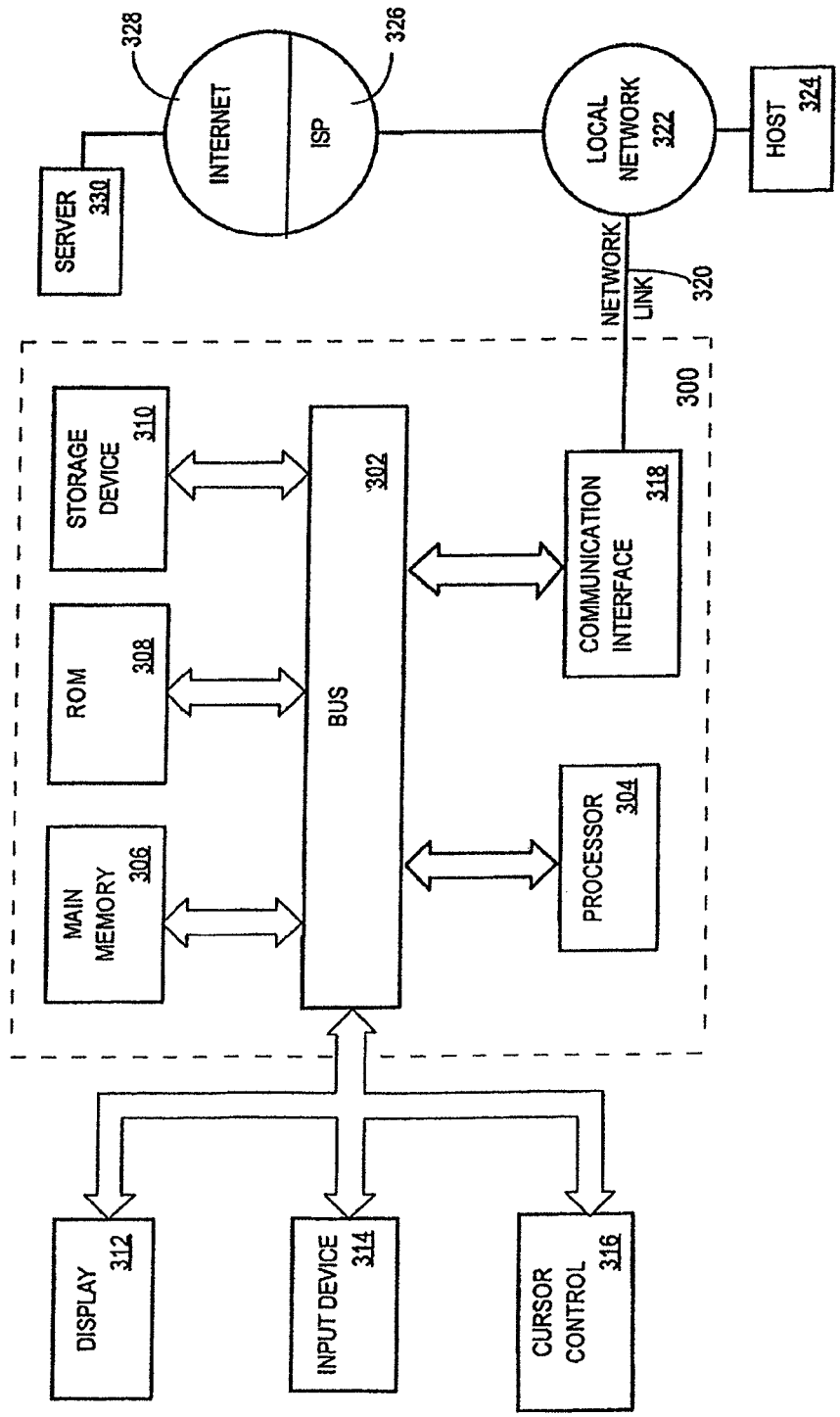
FIG. 3 is a block diagram of a system on which embodiments of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving by a media dispensing device a request from a customer for a particular media content for lease or purchase from the media dispensing device;
   receiving a request by the media dispensing device from the customer to exchange a first digital storage device provided by the customer which is blank for a second digital storage device not provided by the customer from the media dispensing device with the particular media content preloaded;
   accepting the first digital storage device from the customer by the media dispensing device;
   providing the second digital storage device not provided by the customer with the particular media content preloaded to the customer by the media dispensing device;
   storing by the media dispensing device, on the first digital storage device provided by the customer, a second media content available for lease or purchase from the media dispensing device; and
   providing the first digital storage device with the second media content to a different customer.

2. The method of claim 1, wherein accepting the first digital storage device further comprises testing that the first digital storage device is a) compatible and b) capable of storing media.

3. The method of claim 1, wherein the second media content is the same as the particular media content.

4. The method of claim 1, wherein the second media content is different from the particular media content.

5. The method of claim 1, further comprising determining the second media content based at least in part on current inventory of preloaded titles available.

6. The method of claim 1, wherein the second digital storage device with the particular media content preloaded allows viewing of the particular media content within a predetermined window period where the particular media content was leased.

7. The method of claim 1, wherein the second digital storage device is one of: an SD card, mini SD card, CompactFlash, USB flash drive, DVD, CD, portable hard drive, Memory Stick, MultiMediaCard, or SmartMedia card.

8. The method of claim 1, wherein the second media content is stored at a server prior to being stored on the blank digital storage device.

9. The method of claim 8, wherein the second media content is received at the server via a network connection.

* * * * *